N. D. STURGES.
STORAGE BATTERY.
APPLICATION FILED FEB. 27, 1920.
1,340,636.
Patented May 18, 1920.
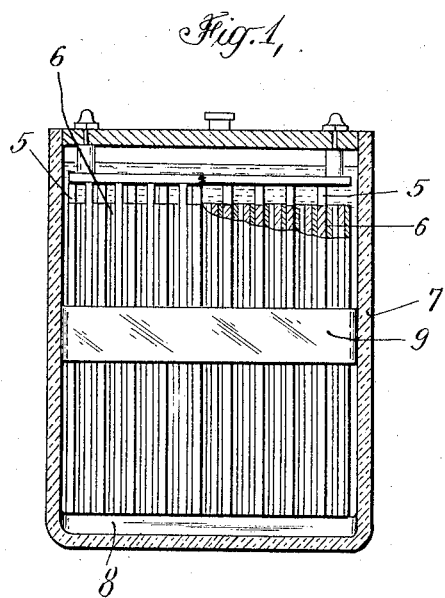
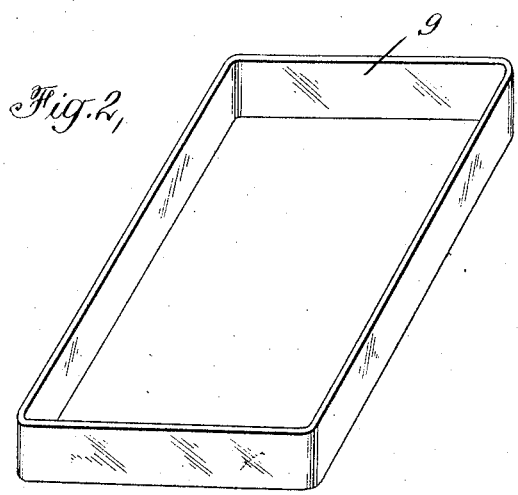
Norman Dexter Sturges Inventor
By his Attorneys
Pennie Davis Marvin Edmonds

UNITED STATES PATENT OFFICE.

NORMAN DEXTER STURGES, OF BELLEROSE QUEENS, NEW YORK, ASSIGNOR TO MULTIPLE STORAGE BATTERY COMPANY, A CORPORATION OF NEW YORK.

STORAGE BATTERY.

1,340,636.  Specification of Letters Patent.  Patented May 18, 1920.

Application filed February 27, 1920. Serial No. 361,887.

*To all whom it may concern:*

Be it known that I, NORMAN DEXTER STURGES, a citizen of the United States, residing at Bellerose Queens P. O., in the county of Queens, State of New York, have invented certain new and useful Improvements in Storage Batteries; and I do hereby declare the following to be a full, clear, and exact description of the invention, such as will enable others skilled in the art to which it appertains to make and use the same.

This invention relates to secondary or storage batteries and has for its object the provision of an improved binder for the plates which is compact, inexpensive and easily applied; and which, because of the elastic property and tensile strength of the material employed, is admirably adapted to hold the plates securely and firmly in proper relation within the battery cell.

Further objects and advantages of the invention will be apparent as it is better understood by reference to the following specification and accompanying drawing, in which—

Figure 1 is an end elevation of a plate assembly illustrating the application of my invention; and Fig. 2 is a view in perspective of the band employed in binding the plates.

Heretofore it has been customary to bind the plates of a storage battery cell with a stout elastic rubber band or by means of hard rubber rectangles into which the bundle of plates is forced, keyed or otherwise fastened; or hard rubber rods with threaded ends are provided to fit holes or lugs in the battery plates and a tie bar is secured to the rods to clamp the plates.

The expedients mentioned have not, however, proved to be entirely satisfactory. Elastic rubber bands do not bind the plates securely and they may, therefore, be deranged, thereby decreasing the efficiency and life of the battery. The bands deteriorate rapidly and must, therefore, be replaced from time to time. On the other hand, hard rubber binders and rods have no elasticity and when the wood separators swell in the battery solution, the binders are frequently ruptured. Hard rubber binders are bulky and consequently reduce the capacity per unit volume of the battery. Since the plates and binders are immersed in a sulfuric acid solution, the binder employed must resist attack by the acid and few materials are, therefore, available.

I have discovered that a superior binder for battery plates may be made from celluloid. This material has heretofore been employed in batteries and its power to resist corrosion by sulfuric acid is known. So far as I am aware, however, binders for battery plates have never previously been made from celluloid. In addition to its acid resistant character, celluloid has other properties which make it especially adaptable for a plate binder in storage batteries. Celluloid has a high tensile strength so that a binder made therefrom may be compact and yet sufficiently strong to hold the plates securely. Furthermore, celluloid possesses exactly the requisite elasticity to permit the wood separators to expand when wet without rupture. The plates cannot, however, become loose because of the elasticity of the binder. These several properties of celluloid, when combined in a binder of the form hereinafter described, assure a most efficient means of securing the plates and consequently improve the character and efficiency of the battery.

Preferably the binder consists of an endless band of celluloid which may, for example, be one-half inch in width and one-thirty-second of an inch in thickness although obviously the dimensions may be varied to meet particular conditions of application. Advantageously, such a band may be cut from a rectangular tube of the required dimensions which is readily formed by extruding the material according to methods well understood in the art. The band may, of course, be made from a strip, the ends of which are secured together with a cement, or in any other suitable manner. The band thus formed is slipped over the plate assembly which is then ready for use.

Referring to the drawing in which the preferred form of my invention is illustrated, 5 indicates the plates and 6 the wood separators, the assembly being arranged within a suitable container 7 and supported, for example, on a single rib 8 as described in my copending application Serial No. 361,888. It is to be understood that the details of the plates and separators form no part of my present invention which is applicable to any of the well known types of storage batteries in which binders for the plates are employed. Furthermore, while my present invention is particularly advantageous when employed in connection with the container having a single rib described in my above mentioned application, it may be employed with containers of any usual or well known form.

The plates 5 and separators 6 are arranged alternately, or the separators may take the form of frames which support and space the plates. When the assembly is complete a band 9 of celluloid is slipped thereover as indicated in the drawing, and the bundle is then placed in the container, to which the electrolyte is then introduced. The swelling of the wood resulting from addition of the electrolyte will tension the celluloid band which thereafter binds the plates and holds the assembly in proper relation to insure the maximum efficiency.

My invention, because of the permanency and security which it imparts to the structure, is a material improvement in storage battery construction. The advantages enumerated are, moreover, provided at a relatively slight expense and with a reduction of the space required in the container to accommodate the fastening means.

Obviously the dimensions and form of the binder may be varied without departing from the invention or sacrificing any of the advantages thereof.

I claim:

1. An improved binder for storage battery plates comprising a band of celluloid adapted to encircle the plates and having sufficient elasticity to permit expansion without being ruptured.

2. An improved binder for storage battery plates comprising an endless band of celluloid cut from a tube thereof and adapted to encircle the plates.

3. An improved binder for storage battery plates comprising a flat endless band of celluloid adapted to encircle the plates, having sufficient strength to hold the plates firmly and elasticity to permit expansion without being ruptured.

4. A storage battery comprising a series of plates and spacers therefor immersed in an electrolyte and a band of celluloid encircling and holding said plates in assembled relation.

5. A storage battery comprising a series of plates and spacers therefor immersed in an electrolyte and an endless band of celluloid encircling and holding said plates in assembled relation and having sufficient elasticity to permit expansion without being ruptured.

In testimony whereof I affix my signature.

NORMAN DEXTER STURGES.